United States Patent
Sekiguchi

(10) Patent No.: US 7,277,227 B2
(45) Date of Patent: Oct. 2, 2007

(54) FRESNEL LENS SHEET, TRANSMISSION SCREEN PROVIDED WITH THE SAME AND REAR PROJECTION DISPLAY

(75) Inventor: Hiroshi Sekiguchi, Shinjuku-Ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 213 days.

(21) Appl. No.: 10/513,023

(22) PCT Filed: Sep. 24, 2003

(86) PCT No.: PCT/JP03/12152

§ 371 (c)(1),
(2), (4) Date: Nov. 1, 2004

(87) PCT Pub. No.: WO2004/029677

PCT Pub. Date: Apr. 8, 2004

(65) Prior Publication Data

US 2005/0180004 A1   Aug. 18, 2005

(30) Foreign Application Priority Data

Sep. 24, 2002   (JP)   ............... 2002-277877

(51) Int. Cl.
G03B 21/60   (2006.01)
G03B 21/56   (2006.01)
(52) U.S. Cl. .............. 359/457; 359/454; 359/460
(58) Field of Classification Search ........... 359/457, 359/443, 453–454, 460
See application file for complete search history.

(56) References Cited

U.S. PATENT DOCUMENTS

| | | | |
|---|---|---|---|
| 2,480,031 A * | 8/1949 | Kellogg | 359/457 |
| 4,082,433 A * | 4/1978 | Appeldorn et al. | 359/742 |
| 4,729,631 A * | 3/1988 | Takahashi et al. | 359/456 |
| 4,773,731 A * | 9/1988 | Goldenberg et al. | 359/457 |
| 5,710,671 A | 1/1998 | Bichlmaier | |
| 5,724,182 A * | 3/1998 | Mitani et al. | 359/457 |
| 6,987,624 B2 * | 1/2006 | Watanabe et al. | 359/742 |
| 7,079,318 B2 * | 7/2006 | Shikama et al. | 359/457 |
| 2002/0094495 A1 | 7/2002 | Ono et al. | |

FOREIGN PATENT DOCUMENTS

| | | | |
|---|---|---|---|
| JP | 57191627 A | * | 11/1982 |
| JP | 61-208041 | | 9/1986 |
| JP | B-62-249134 | | 10/1987 |
| JP | 9-292821 | | 11/1997 |
| JP | A-11-038510 | | 2/1999 |
| JP | 11-142976 | | 5/1999 |

\* cited by examiner

Primary Examiner—W. B. Perkey
Assistant Examiner—Magda Cruz
(74) Attorney, Agent, or Firm—Oliff & Berridge, PLC

(57) ABSTRACT

A Fresnel lens sheet has an entrance surface (1a) and an exit surface (1b). A plurality of prisms (2) each having a refraction surface (3) and a total-reflection surface (4) are formed on the entrance surface (1a). Light rays projected by a light source (M) disposed on the side of the sloping refraction surfaces (3) onto the entrance surface (1a) are refracted at the refraction surfaces (3), and the refracted light rays are totally reflected by a total-reflection surfaces (4) in a direction substantially perpendicular to a sheet surface (1c). Angles (α) between the refraction surfaces (3) and the total-reflection surfaces (4) corresponding to the refraction surfaces (3) of all the prisms (2) are substantially equal to each other. The angle δ between the refraction surface (3) of the prism (P2) farthest from the light source (M) and the sheet surface (1c) is approximately equal to a right angle.

12 Claims, 15 Drawing Sheets

FRESNEL LENS SHEET, TRANSMISSION SCREEN PROVIDED WITH THE SAME AND REAR PROJECTION DISPLAY

TECHNICAL FIELD

The present invention relates to a Fresnel lens sheet to be included in a transmission screen for a projection television set (PTV) or the like, a transmission screen provided with the Fresnel lens sheet, and a rear projection display. More specifically, the present invention relates to a Fresnel lens suitable for application to a transmission screen on which light rays fall at acute angles from behind, a transmission screen provided with the same Fresnel lens sheet, and a rear projection display.

Referring to FIG. 16, a known Fresnel lens sheet disclosed in JP 61-208041A (pp. 2-5, FIG. 8) has an entrance surface provided with a plurality of prisms 72 each having a refraction surface 73 and a total-reflection surface 74. FIGS. 17A and 17B are enlarged views of parts A and B in FIG. 16, respectively. As shown in FIGS. 17A and 17B, a light ray X projected by a projector M disposed behind the Fresnel lens sheet 71 and falling on the back surface of the Fresnel lens sheet 71 at a very acute angle is refracted at the refraction surface 73, the refracted light ray X travels through the prism 72, and is totally reflected by the total-reflection surface 74 in a direction perpendicular to a surface of the Fresnel lens sheet 71.

Thus the light ray X emitted by the projector M falls on the Fresnel lens sheet 71 at a very acute angle. The incidence angle θA of a light ray X2 that falls on a prism P2 farther from the projector M is larger than the incidence angle θB of a light ray X1 that falls on a prism P1 nearer to the projector M. Therefore, the prisms 72 need to be formed such that the angle β between the total-reflection surface 74 of the prism 72 farther from the projector M is smaller than that between the total-reflection surface 74 of the prism 72 nearer to the projector M to make the total-reflection surfaces 74 of all the prisms 72 reflect light rays in a direction perpendicular to the exit surface of the Fresnel lens sheet 71. On the contrary, the angle δ between the refraction surface 73 of the prism 72 farther from the projector M and a sheet surface is larger than that between the refraction surface 73 of the prism 72 nearer to the projector M.

When a transmission screen provided with the Fresnel lens sheet 71 of such a configuration is applied to a rear projection transmission display, the projector M is able to project light rays at large incidence angles on the transmission screen, and hence the rear projection transmission display can be formed in a small thickness.

However, this known Fresnel lens sheet 71 has 1) a problem in manufacturing the same and 2) a double-image problem due to a ghost image formed by stray light rays.

1) Problem in Manufacture

Generally, the Fresnel lens sheet 71 is formed by a UV/radiation curable resin molding process or a hot-pressing process. The UV/radiation curable resin molding process fills a UV/radiation curable resin in a Fresnel lens sheet forming mold, cures the UV/radiation curable resin by irradiating the same with UV rays or radiation, and removes a Fresnel lens sheet 71 thus formed from the mold. The hot-pressing process fills a heated resin in a Fresnel lens sheet forming mold, presses the heated resin, and removes a Fresnel lens sheet thus formed from the mold.

The molds employed in those forming processes are formed by machining work for cutting a metal workpiece, such as a workpiece of aluminum, brass, copper or steel, with a cutting tool. As mentioned above, the prisms 72 at different positions of the Fresnel lens sheet 71 have refraction surfaces 73 and total-reflection surfaces 74 inclined at different angles, respectively, to the surface of the Fresnel lens sheet 71. Therefore, the fabrication of the mold requires very complicated machining.

A Fresnel lens sheet thus molded needs to be removed from the mold. It is difficult to remove some molded Fresnel lens sheets having prisms with surfaces inclined at some angles. A Fresnel lens sheet having prisms 72 with refraction surfaces 73 inclined at angles larger than 90° to the surface of the Fresnel lens sheet is difficult to remove from the mold because the prisms 72 act like a wedge. Even if such a Fresnel lens sheet could be removed from the mold, it is possible that the Fresnel lens sheet would be damaged.

2) Double Image Due to Stray Light Rays

As shown in FIGS. 17B and 18, in some cases, some light rays projected by a projector, not shown, fallen on the foregoing Fresnel lens sheet 71, and refracted at the refraction surfaces 73 fall on the exit surface instead of falling on the total-reflection surfaces 74. The light rays fallen on the exit surface are refracted further at the refraction surfaces 73 and reflected further by the total-reflection surfaces 74 so as to travel forward through the exit surface in stray light rays Y. A ghost image formed by the stray light rays Y and a desired image formed by the desired light rays overlap each other to form a double image. The effect of the prisms 72 near to the projector, on which light rays fall at small incidence angles θ, on forming a double image is particularly remarkable.

DISCLOSURE OF THE INVENTION

The present invention has been made in view of the foregoing circumstances and it is therefore an object of the present invention to provide a Fresnel lens sheet capable of being easily molded, of refracting and reflecting light rays so that the stray light ray ratio, i.e., the ratio of stray light rays to total light rays, may be small and of transmitting light rays at high transmission efficiency, a transmission screen employing the Fresnel lens sheet, and a rear projection display.

To achieve the object, the present invention provides a total-reflection Fresnel lens sheet having an entrance surface and an exit surface and capable of sending out light through the exit surface, that is emitted by a light source and fallen on the entrance surface, and including a plurality of prisms formed on the entrance surface and each having a refraction surface where light emitted by the light source is refracted and a total-reflection surface that totally reflects the light refracted on the refraction surface, wherein angles between the refraction surfaces and the total-reflection surfaces corresponding to the refraction surfaces of all the prisms are substantially equal to each other, and the refraction surface of the prism farthest from the light source is substantially at right angles to a sheet surface of the Fresnel lens sheet.

Since the angles between the refraction surfaces and the total-reflection surfaces corresponding to the refraction surfaces of all the prisms of this Fresnel lens sheet are substantially equal to each other, a machining operation for fabricating a Fresnel lens sheet forming mold for forming the Fresnel lens sheet does not require a plurality of cutting tools, a part for each prism of the workpiece does not need to be shaped by a plurality of cutting passes, and hence the Fresnel lens sheet forming mold can be efficiently fabricated. Since the refraction surface of the prism farthest from the light source is inclined substantially at right angles to the sheet surface, the Fresnel lens sheet and the mold will not be locked together and the molded Fresnel lens sheet can be separated from the mold without being damaged. Since the refraction surfaces of the Fresnel lens sheet are inclined at the largest angle (90°) that will not impede the fabrication of the Fresnel lens sheet to the sheet surface, the stray light ray ratio can be minimized.

In the Fresnel lens sheet according to the present invention, the angle between the total-reflection surface of at least the prism farthest from the light source and the sheet surface is determined such that the total-reflection surface reflects light rays in a direction tilted at an angle toward the side of the light source with respect to a perpendicular direction perpendicular to the sheet surface.

When at least the prism farthest from the light source is thus formed, the stray light ray ratio can be reduced.

It is desirable that the total-reflection surfaces reflect light rays in directions at small angles on the side of the light source to a perpendicular to the sheet surface. More concretely, it is desirable that the total-reflection surface of the prism farthest from the light source reflects light rays in a direction inclined at an angle on the side of the light source in the range of 3° to 15°, more desirably, in the range of 5° to 10°. If this angle is excessively large, the quantity of light reflected by the total-reflection surface of farthest prism and reaching the viewer decreases and part of an image corresponding to the farthest prism becomes faint. If this angle is excessively small, reflection of light rays in a direction at an angle to the perpendicular to the sheet surface is not sufficiently effective.

The angle of the total-reflection surface of at least the prism farthest from the light source may be determined so that the total-reflection surface reflects light rays in a direction tilted at a small angle toward the light source with respect to the perpendicular direction perpendicular to the sheet surface. The angles of the total-reflection surfaces of the prisms at distances within about 600 mm from the farthest prism may be determined so that those total-reflection surfaces reflect light rays in a direction tilted at a small angle toward the light source with respect to the perpendicular direction perpendicular to the sheet surface. Although the angles of reflection of those prisms at distances within about 600 mm from the farthest prism may be the same, it is desirable that the angle of reflection of the prisms farthest from the light source is the largest, and the angles of reflection of the prisms nearer to the light source are smaller. When the angles of reflection of the prisms are thus changed gradually, the viewer will not feel there is something wrong with the image.

In the Fresnel lens sheet according to the present invention, a low-refraction index layer of a material having a low refractive index is formed on the entrance surface.

The low-refraction layer coating the entrance surface reduces the reflection of image light, and an image having a high contrast can be displayed.

The Fresnel lens sheet according to the present invention further includes at least one of a light diffusing element that diffuses light and a light absorbing element that absorbs light.

Stray light rays in the conventional Fresnel lens sheet are refracted at the refraction surfaces and reflected by the total-reflection surfaces and the exit surface, travel through the Fresnel lens sheet and partly outside the Fresnel lens sheet, and some of the stray light rays are sent out through the exit surface and form a ghost image that overlaps a normal image to form a double image. According to the present invention, stray light rays traveling through the Fresnel lens sheet are diffused by the light diffusing element and absorbed by the light absorbing element to prevent the formation of a double image or to make the ghost image indistinct.

In the Fresnel lens sheet according to the present invention, the light diffusing element is formed by dispersing a diffusing material so that diffusion half angle is 10° or below.

In the Fresnel lens sheet according to the present invention, the light diffusing element is a horizontal lenticular lens sheet formed on the exit surface so that diffusion half angle is 10° or below.

The present invention can solve the problem caused by the double image due to the stray light rays. Since the diffusion half angle is 10° or below, the normal function of the Fresnel lens sheet is never spoiled by excessive diffusion of light rays. Preferably, the diffusion half angle is 5° or below, more preferably, on the order of 2°.

In the Fresnel lens sheet according to the present invention, the light absorbing element contains a coloring material so that the light absorbing element has a light absorptance of 50% or below.

The Fresnel lens sheet provided with such a light absorbing element can solve the problem caused by a double image due to stray light rays. The light absorbing element having a light absorptance of 50% or below does not absorb desired light rays excessively.

In the Fresnel lens sheet according to the present invention, the light absorbing element includes a light absorbing layer perpendicular to the sheet surface.

The Fresnel lens sheet provided with such light absorbing layers can solve the problem caused by a double image due to stray light rays. The light absorbing layer perpendicular to the sheet surface does not absorb desired light rays.

The present invention provides a transmission screen including: a total-reflection Fresnel lens sheet having an entrance surface and an exit surface, capable of sending out light through the exit surface, that is emitted by a light source and fallen on the entrance surface, and including a plurality of prisms formed on the entrance surface and each having a refraction surface where light emitted by the light source is refracted and a total-reflection surface that totally reflects the light refracted at the refraction surface, wherein angles between the refraction surfaces and the total-reflection surfaces corresponding to the refraction surfaces of all the prisms are substantially equal to each other, and the refraction surface of the prism farthest form the light source is inclined substantially at right angles to a sheet surface of the Fresnel lens sheet; and a light diffusing element for diffusing light rays formed integrally with the Fresnel lens sheet.

The stray light ray ratio in the Fresnel lens sheet of the transmission screen is small, and the transmission screen is capable of transmitting light at a high transmission efficiency.

The light diffusing element is, for example, a diffusing material dispersed in the Fresnel lens sheet or a lenticular sheet formed on the exit surface of the Fresnel lens sheet. Preferably, the light diffusing element, such as the diffusing material or the lenticular sheet, for the transmission screen has a diffusion half angle of 10° or above, more preferably, 20° or above.

A transmission screen according to the present invention includes: a total-reflection Fresnel lens sheet having an entrance surface and an exit surface, capable of sending out light through the exit surface, that is emitted by a light source and fallen on the entrance surface, and including a plurality of prisms formed on the entrance surface and each having a refraction surface where light emitted by the light source is refracted and a total-reflection surface that totally reflects the light refracted on the refraction surface, wherein angles between the refraction surfaces and the total-reflection surfaces corresponding to the refraction surfaces of all the prisms are substantially equal to each other, and the refraction surface of the prism farthest form the light source is inclined substantially at right angles to a sheet surface of the Fresnel lens sheet; and a light diffusing element for diffusing light rays positioned on the exit surface of the Fresnel lens sheet.

The stray light ray ratio in the Fresnel lens sheet of the transmission screen is small, and the transmission screen is capable of transmitting light at a high transmission efficiency.

A rear projection display according to the present invention includes: a box serving as a housing and having a front wall provided with a window; a transmission screen including a total-reflection Fresnel lens sheet placed in the window formed in the front wall of the box, having an entrance surface and an exit surface, capable of sending out light through the exit surface, that is emitted by a light source and fallen on the entrance surface and including a plurality of prisms formed on the entrance surface and each having a refraction surface where light emitted by the light source is refracted and a total-reflection surface that totally reflects the light refracted at the refraction surface, wherein angles between the refraction surfaces and the total-reflection surfaces corresponding to the refraction surfaces of all the prisms are substantially equal to each other, and the refraction surface of the prism farthest form the light source is inclined substantially at right angles to a sheet surface of the Fresnel lens sheet, and a light diffusing element for diffusing light rays formed integrally with the Fresnel lens sheet in the Fresnel lens sheet; and a projector disposed in the box and capable of projecting image light rays from behind the transmission screen at acute incidence angles on the entrance surface of the transmission screen.

A rear projection display according to the present invention includes: a box serving as a housing and having a front wall provided with a window; a transmission screen including a total-reflection Fresnel lens sheet placed in the window formed in the front wall of the box, having an entrance surface and an exit surface, capable of sending out light through the exit surface, that is emitted by a light source and fallen on the entrance surface and including a plurality of prisms formed on the entrance surface and each having a refraction surface where light emitted by the light source is refracted and a total-reflection surface that totally reflects the light refracted at the refraction surface, wherein angles between the refraction surfaces and the total-reflection surfaces corresponding to the refraction surfaces of all the prisms are substantially equal to each other, and the refraction surface of the prism farthest form the light source is substantially at right angles to a sheet surface, and a light diffusing element for diffusing light rays positioned on the exit surface of the Fresnel lens sheet; and a projector disposed in the box and capable of projecting image light rays from behind the transmission screen at acute incidence angles on the entrance surface of the transmission screen.

The stray-total light ray ratio in the Fresnel lens sheet of the transmission screen is small, and the rear projection display is capable of transmitting light at high transmission efficiency.

BEST MODE FOR CARRYING OUT THE INVENTION

Fresnel lens sheets according to the present invention, transmission screens employing those Fresnel lens sheets and a rear projection display in preferred embodiments according to the present invention will be described with reference to the accompanying drawings.

FIRST EMBODIMENT

Fresnel Lens Sheet

Figure 1:
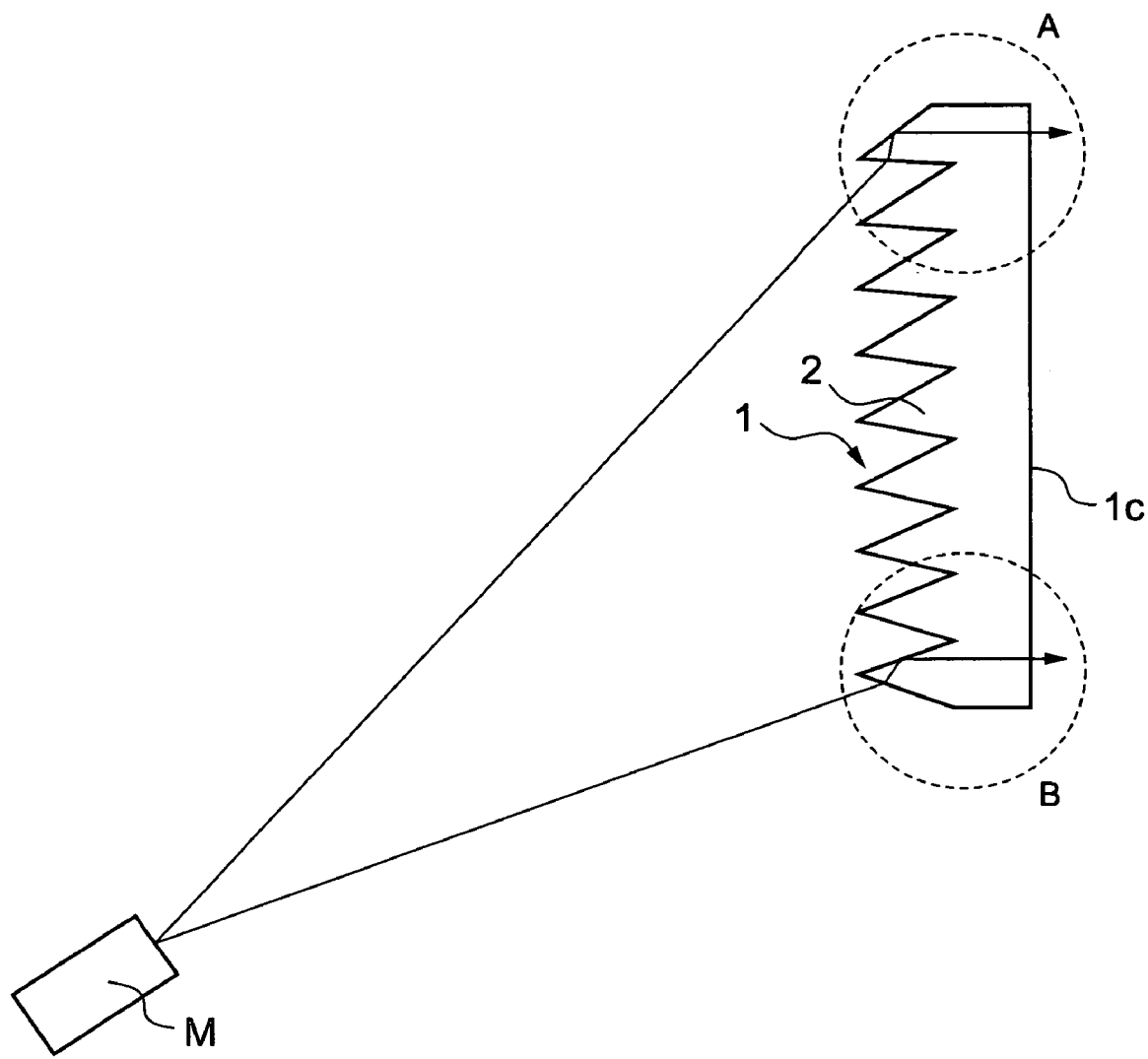
FIG. 1 is a sectional view of a Fresnel lens sheet in a first embodiment according to the present invention.

A Fresnel lens sheet in a first embodiment according to the present invention will be described. FIG. 1 is a sectional view of a Fresnel lens sheet in the first embodiment, and FIGS. 2A and 2B are fragmentary enlarged views of Parts A and B in FIG. 1.

Figure 2A:
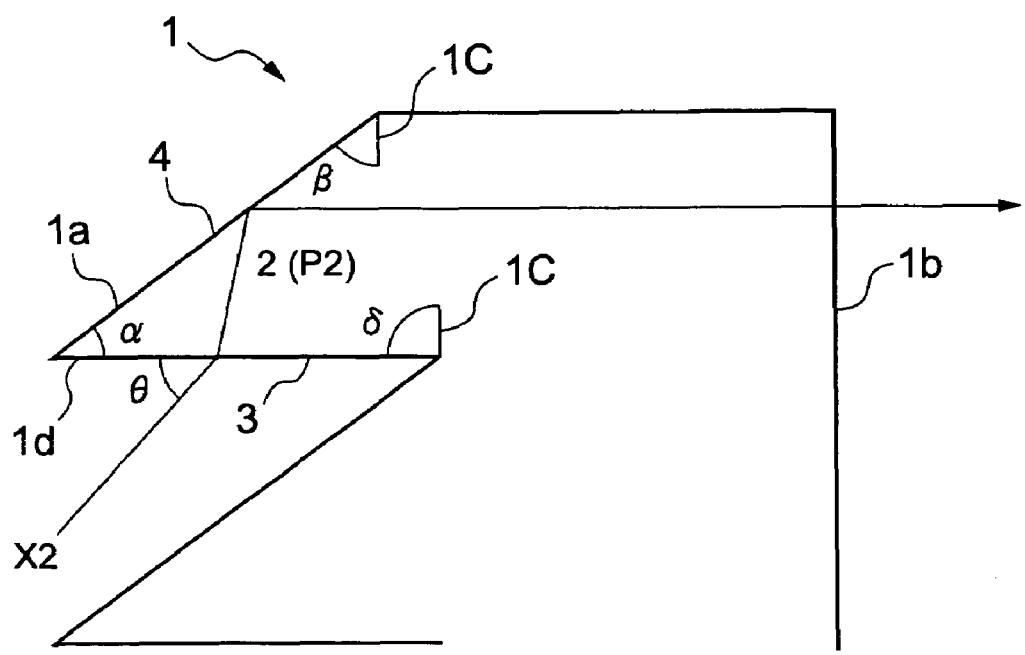
FIG. 2A is a fragmentary enlarged view of the Fresnel lens sheet shown in FIG. 1.
Figure 2B:
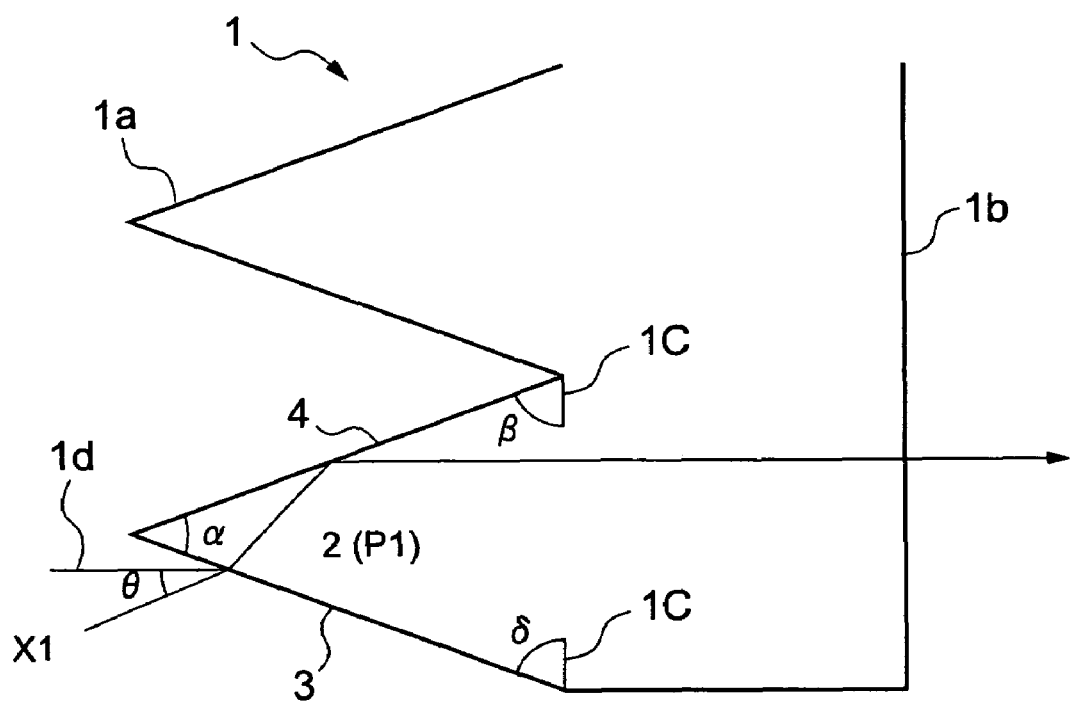
FIG. 2B is a fragmentary enlarged view of the Fresnel lens sheet shown in FIG. 1.

Referring to FIGS. 1, 2A and 2B, a Fresnel lens sheet 1 has an entrance surface 1a and an exit surface 1b. The Fresnel lens sheet 1 is a total-reflection type of lens sheet that receives light rays emitted by a light source M through the entrance surface 1a and sends out the light rays through the exit surface 1b. A plurality of prisms 2 are formed on the entrance surface 1b. Each of the prisms 2 has a refraction surface 3 where light rays X fallen on the Fresnel lens sheet 2 are refracted and a total-reflection surface 4 that reflects totally the light rays X refracted on the refraction surface 3 toward the viewing side.

The angle between the refraction surface 3 and the total-reflection surface 4 of each of all of the prisms 2 is $\alpha$, which is the same for all of the prisms. The refraction surface 3 and the total-reflection surface 4 are inclined at angles $\delta$ and $\beta$, respectively, with respect to a sheet surface (reference surface of the Fresnel lens sheet 1) 1c of the Fresnel lens sheet. The angle $\beta$ is determined such that the total-reflection surface 4 reflects incident light rays in a total reflection mode in a direction perpendicular to the sheet surface 1c. Light rays projected by a projector M, namely, a light source, fall on a prism P1, the nearest to the projector M, of the Fresnel lens sheet 1 at the smallest incidence angle $\theta$, i.e., the angle between the incident light ray and a normal 1d to the sheet surface 1c, and the light rays fall at larger incidence angles $\theta$ on the Fresnel lens sheet 1 for prisms farther from the projector M. Therefore, the angle $\beta$ for the prism P1 the nearest to the projector M is the largest, and the angles $\beta$ for the prisms farther from the projector M are smaller. Since the angle $\alpha$ is the same for all of the prisms, the angle $\delta$ for the prism P1 the nearest to the projector M is the smallest and the angles $\delta$ for the prisms farther from the projector M are larger. In this Fresnel lens sheet 1 of the present invention, the angle $\delta$ for the prism P2 the farthest to the projector M is approximately 90°.

Method of Fabricating the Fresnel Lens Sheet

Figure 3:
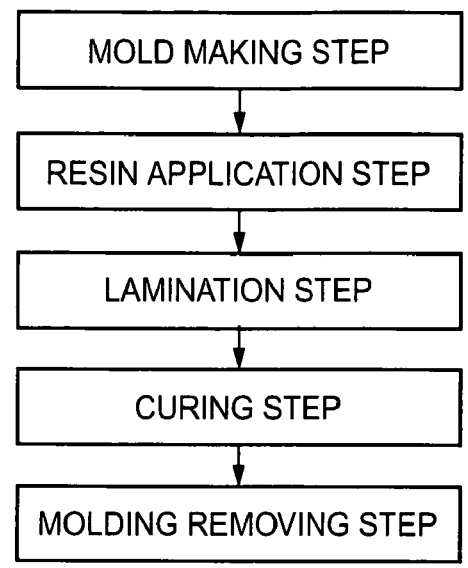
FIG. 3 is a flow chart of a method of fabricating a Fresnel lens sheet according to the present invention.

A Fresnel lens sheet fabricating method of fabricating the Fresnel lens sheet 1 will be explained. The Fresnel lens sheet 1 is fabricated by, for example, a UV/radiation curable resin molding process. A Fresnel lens sheet fabricating method using a UV/radiation curable resin molding process will be described. FIG. 3 shows steps of a Fresnel lens sheet fabricating method.

Figure 4A:
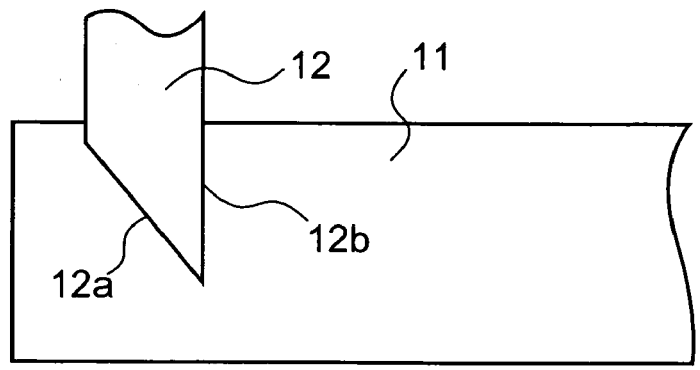
FIG. 4A is a typical view of assistance in explaining a machining method of making a forming mold for forming a Fresnel lens sheet according to the present invention.
Figure 4B:
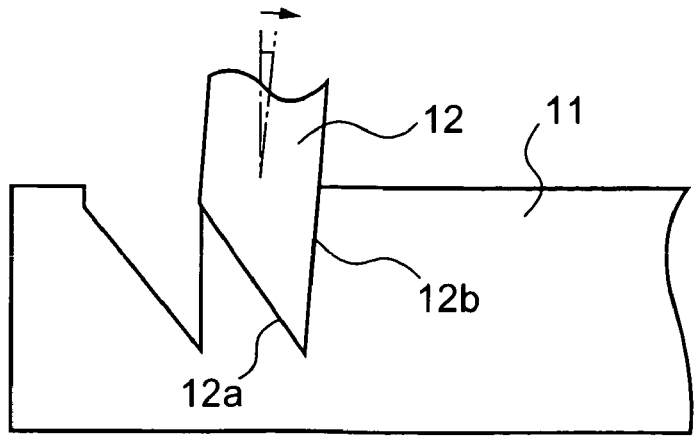
FIG. 4B is a typical view of assistance in explaining a machining method of making a forming mold for forming a Fresnel lens sheet according to the present invention.

A mold for forming the Fresnel lens sheet 1 is made by a mold making step. Referring to FIG. 4, in the mold making step a Fresnel lens sheet forming mold is made by engraving a shape corresponding to that of the Fresnel lens sheet 1 in a metal workpiece 11 of aluminum, a brass, copper or a steel with a cutting tool 12. The cutting tool 12 has a tool angle substantially equal to the angle $\alpha$ between the refraction surface 3 and the total-reflection surface 4 of the prism 2 of the Fresnel lens sheet 1. When cutting a part for the prism farthest from the projector M with the cutting tool 12, the cutting tool 12 is held perpendicularly to the surface of the metal workpiece 11, and an inclined surface corresponding to the total-reflection surface 4 is cut with the edge of an inclined surface 12a of the cutting tool 12 and a vertical surface corresponding to the refraction surface 3 is cut with the edge of a vertical surface 12b of the cutting tool 12 as shown in FIG. 4A. When cutting a part of the metal workpiece 11 for the prism 2 next to the prism farthest from the projector M on the side of the projector M, the cutting tool 12 is tilted in the direction of the arrow shown in FIG. 4B by a tilt angle equal to the remainder of subtraction of the angle $\delta$ of the refraction surface 3 of the prism 2 from 90° as shown in FIG. 4B. The cutting tool 12 is tilted by a greater tilt angle for cutting a part of the metal workpiece 11 for a prism nearer to the projector M. Thus, the machining operation for fabricating the Fresnel lens sheet forming mold does not need to use a plurality of cutting tools, a part for each prism of the workpiece 11 does not need to be shaped by a plurality of cutting passes, and hence the Fresnel lens sheet forming mold can be efficiently fabricated. In some cases, a part for each prism is machined by a plurality of cutting passes to finish the surfaces defining a groove corresponding to the prism in a high accuracy. Even in such a case, the number of passes for finishing the surfaces in a high accuracy is smaller than that of passes necessary for finishing surfaces defining a groove corresponding to each of the prisms of the conventional Fresnel lens sheet in the same accuracy.

Then, a resin application step is carried out. In the resin application step, a UV/radiation curable resin is applied to the forming surface of the Fresnel lens sheet forming mold by a roller coating method, a dispenser method, a curtain coating method or a die coating method to form a UV/radiation curable resin film.

Then, a lamination step is carried out. In the lamination step, a substantially transparent substrate permeable to UV/radiation rays is laminated to the UV/radiation curable resin film formed by the resin application step, and pressure is applied to the substrate to join the UV/radiation curable resin film and the substrate close together.

Then, a curing step is carried out. In the curing step, the UV/radiation curable resin film is irradiated through the substrate with UV/radiation rays to cure the UV/radiation curable resin film.

Lastly, a molding removing step is carried out. In the molding removing step, a laminated structure (Fresnel lens sheet 1) of the cured UV/radiation curable resin film and the substrate is removed from the Fresnel lens sheet forming mold. Since the refraction surfaces 3 of the prisms 2 of the Fresnel lens sheet 1 are inclined at angles $\delta$ below 90° to the sheet surface 1c, the Fresnel lens sheet 1 and the mold will not be locked together and the molded Fresnel lens sheet 1 can be separated from the mold without being damaged.

Although the Fresnel lens sheet fabricating method described above is a UV/radiation curable resin molding process, the Fresnel lens sheet fabricating method may be a hot-pressing process. A Fresnel lens sheet forming mold for the hot-pressing process can be made by efficient machining, and the Fresnel lens sheet can be easily and safely removed from the Fresnel lens sheet forming mold like the Fresnel lens sheet formed by the UV/radiation curable resin molding presses.

Transmission Screen

A transmission screen provided with the Fresnel lens sheet 1 will be described.

Figure 5:
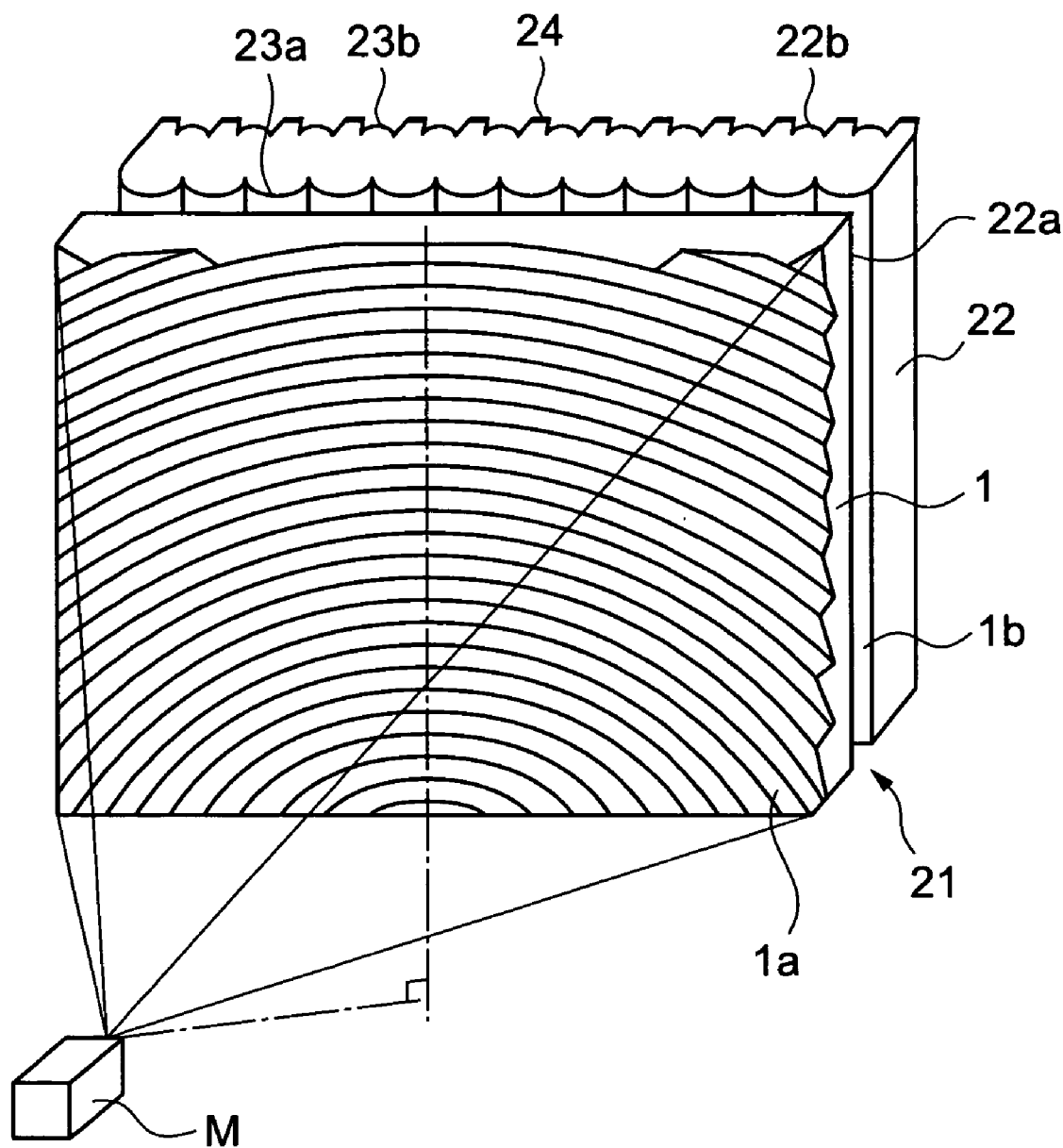
FIG. 5 is a perspective view of a transmission screen in the first embodiment according to the present invention.

FIG. 5 is a perspective view of a transmission screen 21 in a first embodiment according to the present invention.

Referring to FIG. 5, the transmission screen 21 is formed by disposing a lenticular sheet (lenticular lens sheet) 22, namely, light diffusing element, in front of the exit surface 1b of the Fresnel lens sheet 1.

The lenticular sheet 22 has vertical, semicylindrical lenses 23a and 22b formed on the entrance surface 22a and the exit surface 22b thereof, respectively. A light absorbing layer 24 is formed on the exit surface 22b so as to cover parts between the adjacent lenses 23b of the exit surface 22b. The lenses 23a and 23b of the lenticular sheet 22 horizontally diffuse light rays projected by a projector M and collimated by the Fresnel lens sheet 1 so as to travel perpendicularly to the sheet surface 1c of the Fresnel lens sheet 1 to display an image so as to be viewable from directions in a wide viewing angle. The light absorbing layer 24 absorbs external light falling on the exit surface 22b of the lenticular sheet 22 to form an image having a high contrast. The lenticular sheet 22 is formed such that horizontal diffusion half angle is 10° or larger, preferably, 20° or larger. The horizontal diffusion half angle is a horizontal angle, from a perpendicular to the front surface of the transmission screen, of a direction from which an image displayed on a transmission screen looks in a brightness (luminance) half a maximum brightness (maximum luminance). The maximum brightness of the same image is made as viewed from a direction perpendicular to the surface of the transmission screen.

Figure 6:
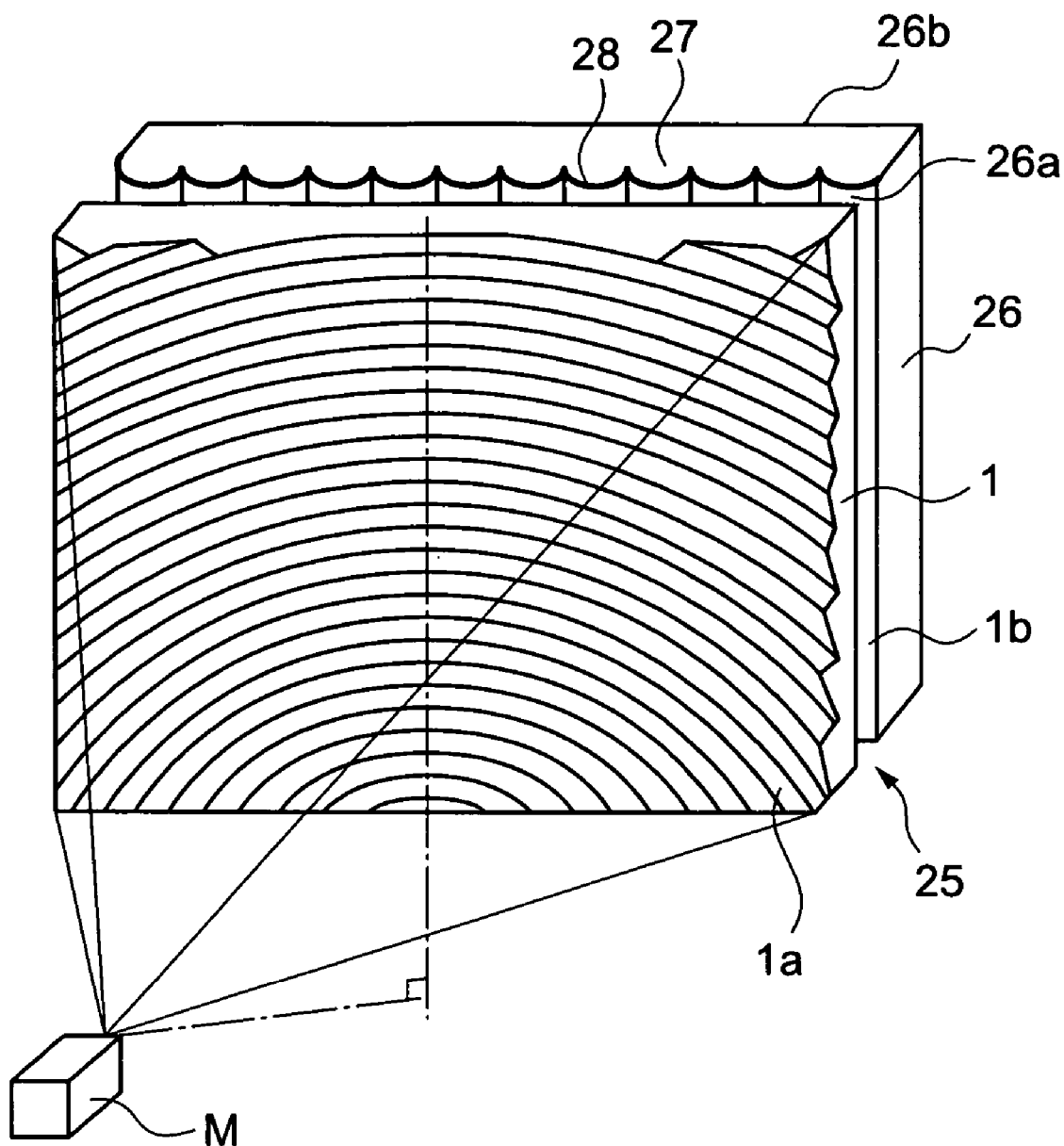
FIG. 6 is a perspective view of another transmission screen in the first embodiment according to the present invention.

FIG. 6 shows a transmission screen 25 provided with a lenticular sheet (lenticular lens sheet) 26. The lenticular sheet 26 includes vertical semicylindrical lenses 27 only on its entrance surface 26a. The lenses 27 are coated with a light absorbing layer 28. The lenses 27 of the lenticular sheet 26 horizontally diffuse light rays projected by a projector M and collimated by the Fresnel lens sheet 1 so as to travel perpendicularly to the sheet surface 1c of the Fresnel lens sheet 1 to display an image so as to be viewable from directions in a wide viewing angle. The light absorbing layer 28 absorbs external light falling on the exit surface 26b of the lenticular sheet 26 to form an image having a high contrast. External light penetrated the exit surface 26b and fallen on the light absorbing layer 28 is reflected by the inner surface of the light absorbing layer 28 and travels along the light absorbing layer 28 in the light absorbing layer 28. Consequently, most part of the external light is absorbed by the light absorbing layer 28. On the other hand, light fallen on the entrance surface 26a travels across the light absorbing layer 28 in the direction of the thickness of the light absorbing layer 28. Consequently, the light is absorbed scarcely the by light absorbing layer 28 and hence an image having a high contrast can be formed.

Figure 7:
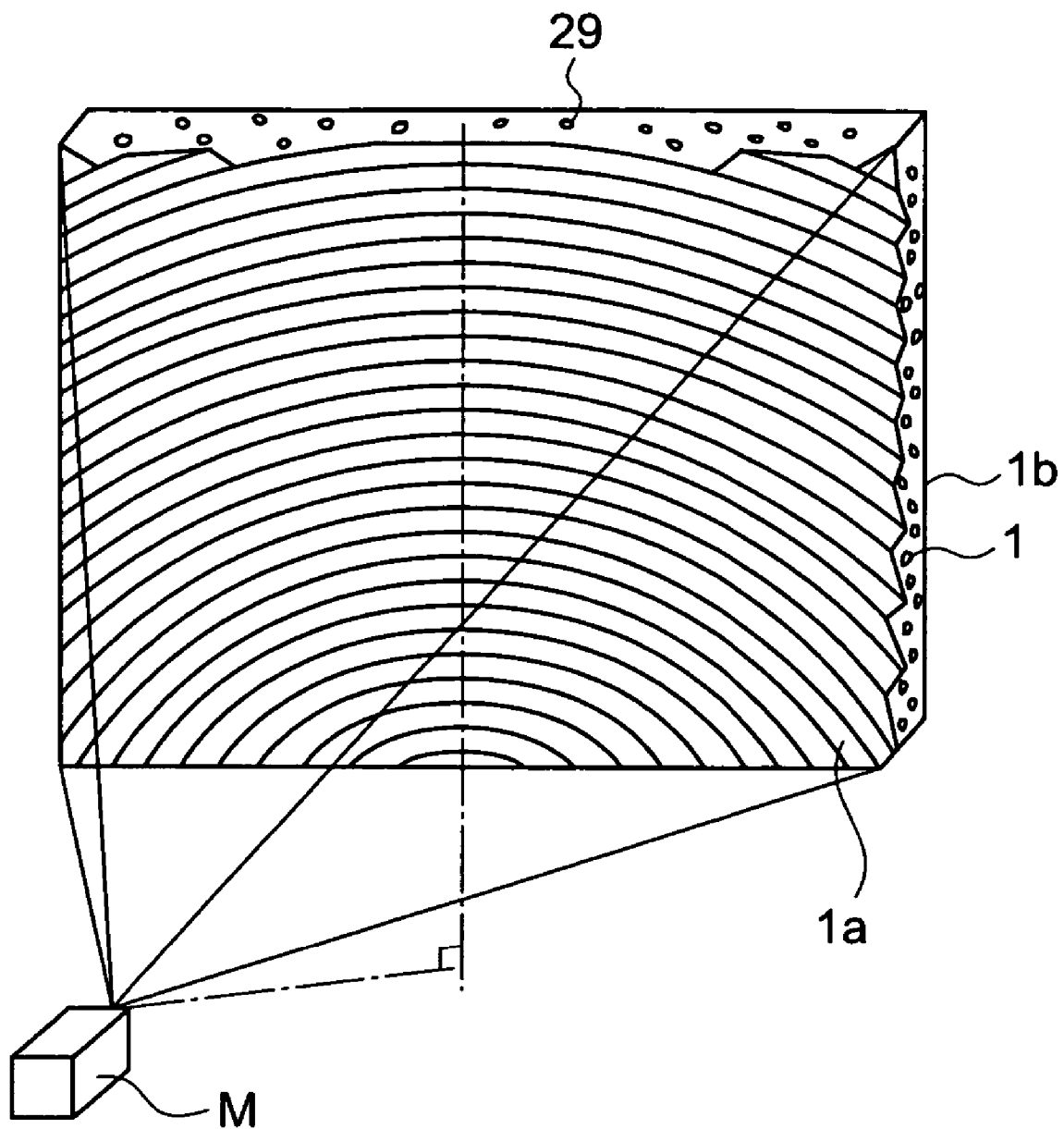
FIG. 7 is a perspective view of a third transmission screen in the first embodiment according to the present invention.
Figure 8:
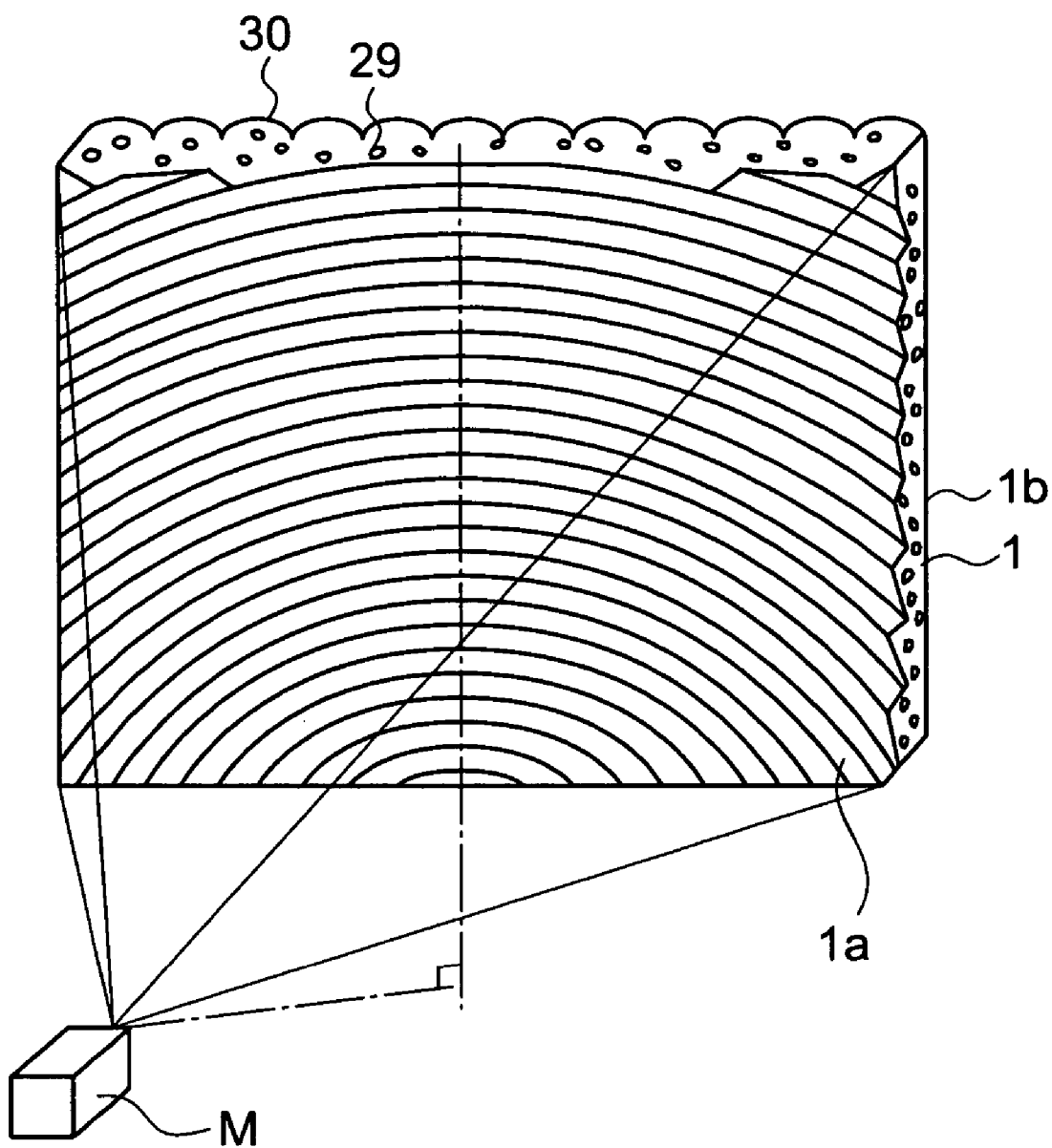
FIG. 8 is a perspective view of a fourth transmission screen in the first embodiment according to the present invention.
Figure 9:
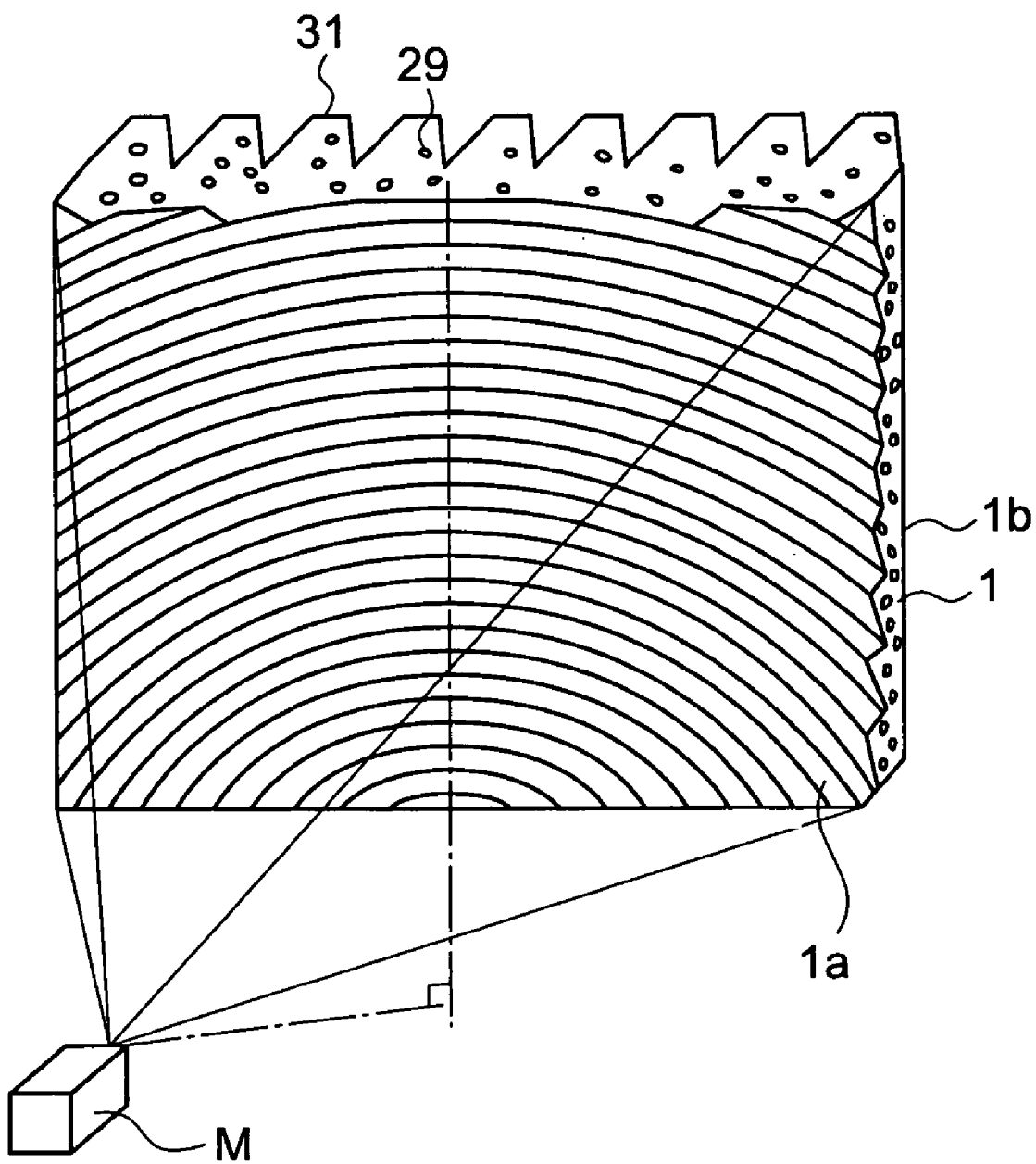
FIG. 9 is a perspective view of a fifth transmission screen in the first embodiment according to the present invention.

A transmission screen may be formed by putting a light diffusing element in the Fresnel lens sheet 1. The light diffusing material may be a diffusing material 29 dispersed in the Fresnel lens sheet 1 as shown in FIG. 7. Vertical, semicylindrical lenses 30 can be formed on the exit surface 1b of the Fresnel lens sheet 1 as shown in FIG. 8 or vertical lenses 31 having a trapezoidal cross section can be formed on the exit surface 1b of the Fresnel lens sheet 1 as shown in FIG. 9. The semicylindrical lenses 30 and the lenses 31 having a trapezoidal cross section may be used in combination with the diffusing material 29 as shown in FIGS. 8 and 9.

Rear Projection Display

Figure 10:
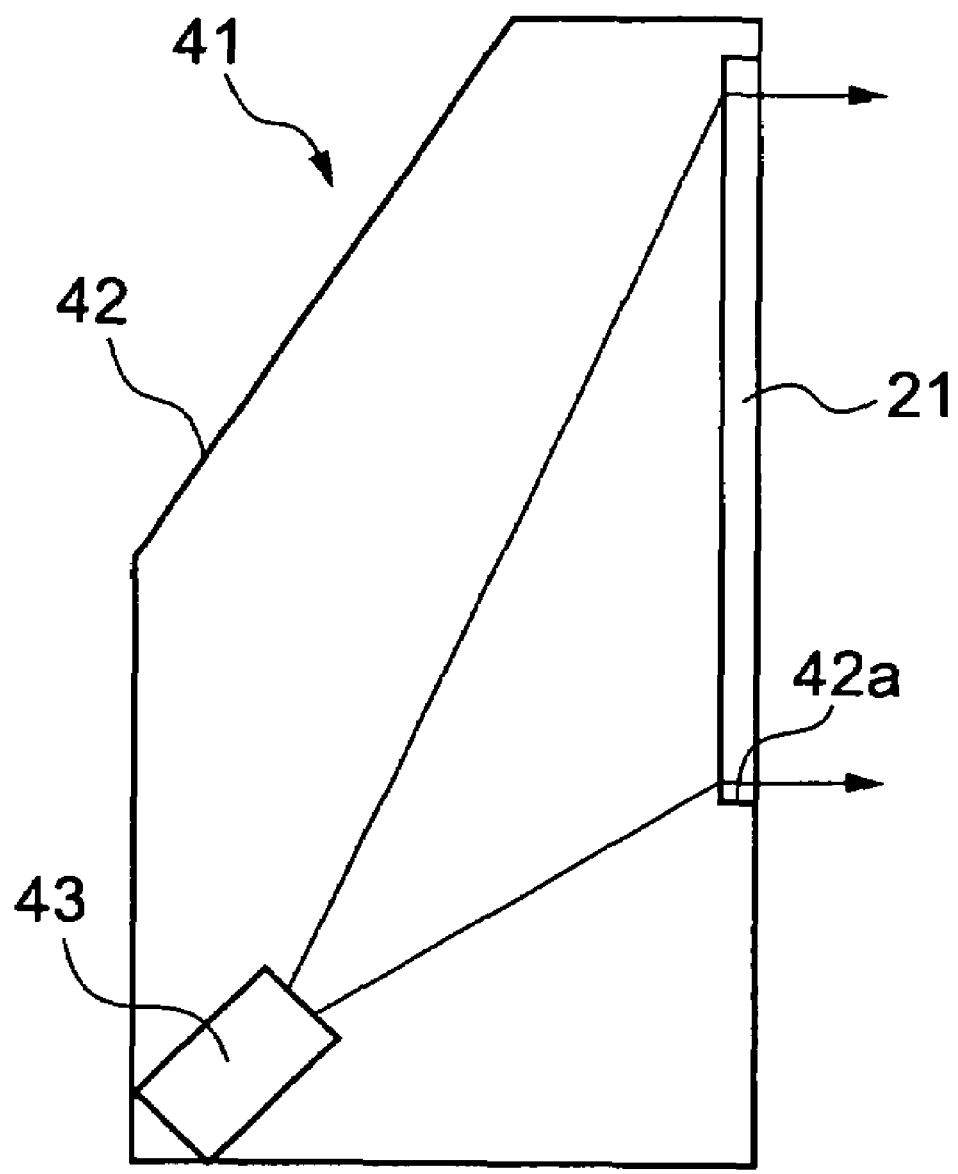
FIG. 10 is a sectional view of a rear projection display in a first embodiment according to the present invention.

FIG. 10 is a sectional view of a rear projection display 41 in a first embodiment according to the present invention. The rear projection display 41 includes, as principal components, a box 42 serving as a housing and having a front wall provided with a window 42a, a transmission screen 21 disposed in an upper part of the front wall of the box 42, and a projector 43 disposed behind the transmission screen 21 in the box 42 and capable of projecting image light rays obliquely upward on the transmission screen 21 from behind the transmission screen 21. The box 42 is formed of a resin, a metal or the like, and the window 42a is formed in an upper part of the front wall of the box 42. When necessary, the box 42 is finished by a decorative process, such as a coloring process, to improve the aesthetic design of the box 42.

The transmission screen 21 is fabricated as mentioned above. Generally, the transmission screen 21 is formed in a laterally elongate rectangular shape having an aspect ratio of 3 to 4 (standard screen) or an aspect ratio of 9 to 16 (wide screen). The transmission screen 21 is placed in the window 42a of the box 42 with its front surface, namely, with the exit surface facing out.

The projector 43 includes an optical imaging device, such as a CRT or an LCD, and a projection lens for enlarging an optical image formed by the optical imaging device. The projector 43 projects the optical image from behind the transmission screen 21 in an enlarged optical image on the transmission screen 21. The projector 43 is disposed such that image light rays projected by the projector 43 and fallen on the transmission screen 21 are reflected by the total-reflection surfaces 4 of the Fresnel lens sheet 1 in a direction perpendicular to the sheet surface of the Fresnel lens sheet 1. In other words, the angles β between the total-reflection surfaces 4 of the Fresnel lens sheet 1 and the screen surface of the Fresnel lens sheet 1 are determined so that the image light rays projected by the projector 33 are reflected in a direction perpendicular to the sheet surface of the Fresnel lens sheet 1.

In the rear projection display 41, image light rays projected by the projector 43 fall on the transmission screen 21 at acute incidence angles. The image light rays are refracted on the refraction surfaces 3 of the Fresnel lens sheet 1, and the refracted image light rays are reflected totally by the total-reflection surfaces 4 in a direction perpendicular to the sheet surface. The image light rays emerging from the Fresnel lens sheet 1 in the direction perpendicular to the sheet surface are diffused horizontally, and the diffused image light rays are emitted toward the viewing side.

Some of the image light rays projected by the projector 43 and fallen on the prisms 2 comparatively near to the projector 43 are unable to reach the total-reflection surfaces 4 and becomes stray light rays. In the Fresnel lens sheet 1 of the present invention, the angle δ between the sheet surface 1c and the refraction surface 3 of the prism P2 farthest from the projector 43 is substantially equal to 90°, which is the largest angle δ that does not impede the fabrication of the Fresnel lens sheet 1. Therefore, the angle δ between the refraction surface 3 of the prism 2 near the projector 43 and the sheet surface is large and hence the stray light ray ratio is small.

Figure 11A:
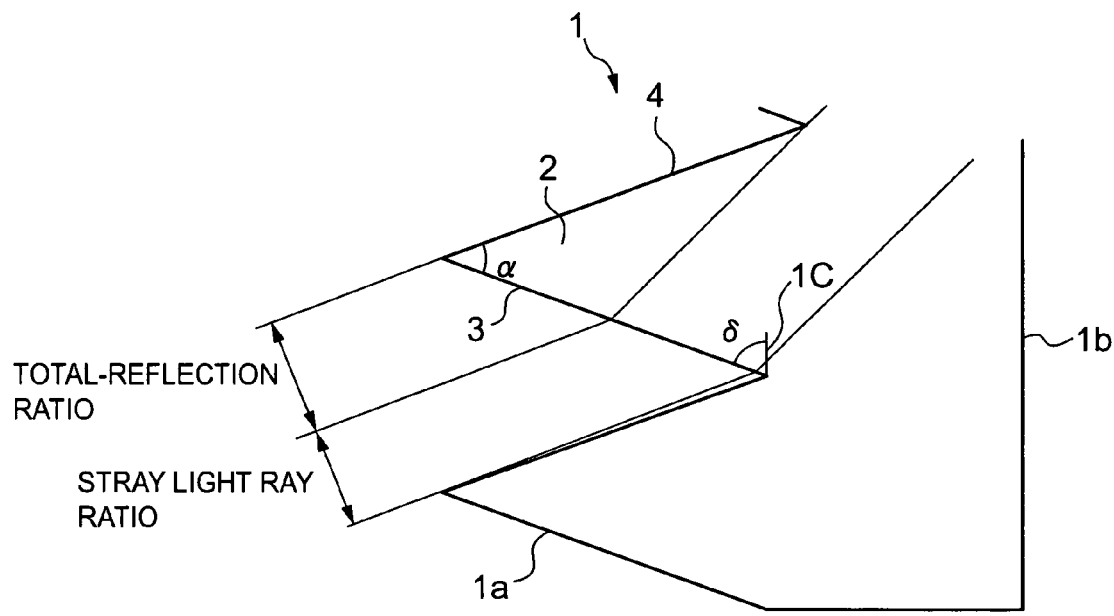
FIG. 11A is a diagrammatic view of assistance in explaining the transmission efficiency of a Fresnel lens sheet according to the present invention.
Figure 11B:
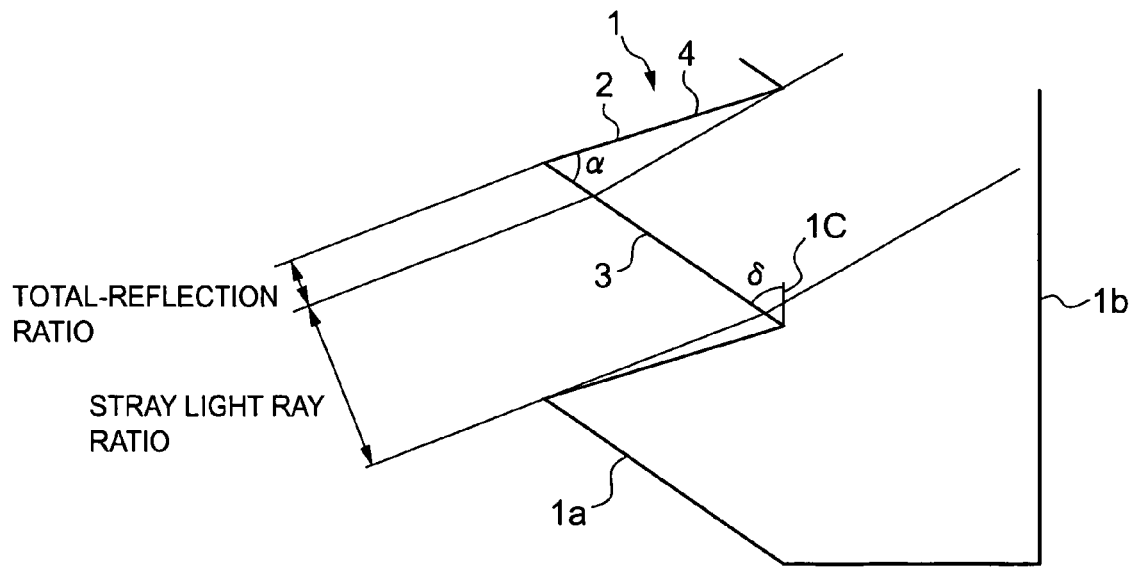
FIG. 11B is a diagrammatic view of assistance in explaining the transmission efficiency of a Fresnel lens sheet according to the present invention.

Referring to FIGS. 11A and 11B, the stray light ray ratio in the prism 2 of the Fresnel lens sheet 1 of the present invention shown in FIG. 11A is smaller than that of the prism 2 of the conventional Fresnel lens sheet 1 in which the maximum angle δ between the refraction surface 3 and the sheet surface 1c is less than 90° shown in FIG. 11B. The stray light ray ratio in the Fresnel lens sheet 1 of the present invention is small because the angle δ between the refraction surface 3 of the prism P2 the most distance from the projector M and the sheet surface 1c is 90° and the angle δ between the refraction surface 3 of the prism P1 near the projector M and the sheet surface 1c is comparatively large. Thus, the Fresnel lens sheet 1 of the present invention has a high transmittance and hence the rear projection display 41 provided with the Fresnel lens sheet 1 of the present invention is able to display an image having a high contrast.

Although the rear projection display 41 provided with the transmission screen shown in FIG. 5 has been described, the rear projection display 41 may be provided with any one of the transmission screens shown in FIGS. 6 to 9.

SECOND EMBODIMENT

A second embodiment employs a Fresnel lens sheet having a prism farthest from a projector and capable of collimating light rays in a direction slightly inclined toward the side of the projector with respect to a direction perpendicular to the sheet surface of the Fresnel lens sheet.

The Fresnel lens sheet in the second embodiment is similar in construction, function and effect to the Fresnel lens sheet in the first embodiment, except that former Fresnel lens sheet has the prism farthest from the projector and capable of collimating light rays in a direction slightly inclined toward the side of the projector with respect to a direction perpendicular to the sheet surface thereof. A method of fabricating the Fresnel lens sheet in the second embodiment and a method of constructing a rear projection display provided with the same Fresnel lens sheet are the same as those mentioned in connection with the first embodiment. Therefore, only the construction of the Fresnel lens sheet in the second embodiment will be described.

Fresnel Lens Sheet

A Fresnel lens sheet 51 in the second embodiment will be described with reference to FIGS. 12A and 12B, in which parts like or corresponding to those of the Fresnel lens sheet 1 in the first embodiment shown in FIG. 1 are denoted by the same reference characters and the description thereof will be omitted.

Figure 12A:
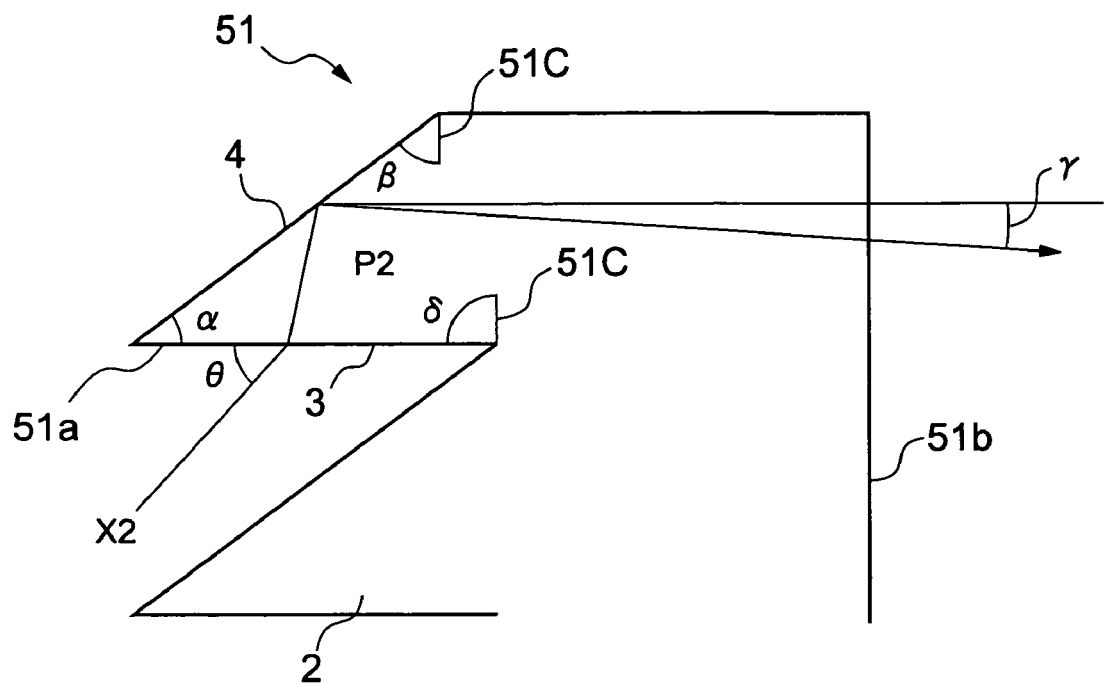
FIG. 12A is a fragmentary enlarged view of a Fresnel lens sheet in a second embodiment according to the present invention.
Figure 12B:
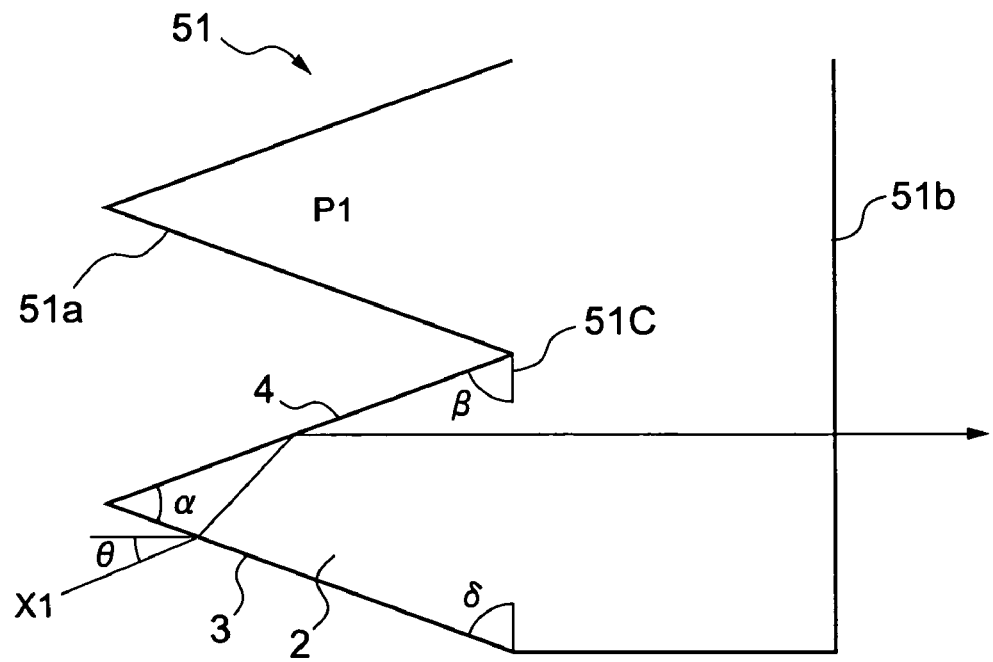
FIG. 12B is a fragmentary enlarged view of the Fresnel lens sheet in the second embodiment.

Referring to FIGS. 12A and 12B, the Fresnel lens sheet 51 has an entrance surface 51a and an exit surface 51b. The angle $\beta$ between a total-reflection surface 4 included in at least a prism P2 farthest from a projector M and a sheet surface 51c is determined such that light rays reflected by the total-reflection surface 4 travel in a direction inclined at a small angle $\gamma$ toward the side of the projector M with respect to a direction perpendicular to the sheet surface 51c. When the direction in which the total-reflection surface 4 reflects light rays is declined toward the side of the projector, the angle $\beta$ between the total-reflection surface 4 and the sheet surface 51c is larger than the angle $\beta$ between the total-reflection surface that reflects light rays in a direction perpendicular to the sheet surface and the sheet surface and, consequently, the angle $\alpha$ between the total-reflection surface 4 and the refraction surface 3 of the same prism is small. The small angle $\alpha$ is effective in reducing the stray light ray ratio. The angle $\delta$ between the refraction surface of the prism P2 and the sheet surface 51c is 90°.

Although only the prism P2 farthest from the projector M may be formed so as to reflect light rays in the direction inclined toward the projector M at the small angle with respect to the direction perpendicular to the sheet surface 51c, it is desirable to determine the angles $\beta$ of prisms 2 in a range between the prism P2 farthest from the projector M and a position a predetermined distance, such as about 600 mm away from the prism P2, such that those prisms 2 can reflect light rays in directions inclined toward the side of the projector M. In this case, the refraction surfaces 3 of those prisms 2 can be easily inclined at angles $\delta$ not greater than 90° with respect to the sheet surface 51c. A prism P1 reflects light rays in a direction perpendicular to the sheet surface 51c.

THIRD EMBODIMENT

A third embodiment employs a Fresnel lens sheet formed by coating the surface of the Fresnel lens sheet in the first embodiment with a coating layer, and dispersing a diffusing material in the Fresnel lens sheet in the first embodiment.

The Fresnel lens sheet in the third embodiment is similar in construction, function and effect to the Fresnel lens sheet in the first embodiment, except that former Fresnel lens sheet is provided with the coating layer and contains the diffusing material. A method of fabricating the Fresnel lens sheet in the third embodiment and a method of constructing a rear projection display provided with the same Fresnel lens sheet are the same as those mentioned in connection with the first embodiment. Therefore, only the construction of the Fresnel lens sheet in the third embodiment will be described.

Fresnel Lens Sheet

A Fresnel lens sheet 61 in the third embodiment will be described with reference to FIG. 13, in which parts like or corresponding to those of the Fresnel lens sheet 1 in the first embodiment shown in FIG. 1 are denoted by the same reference characters and the description thereof will be omitted.

Figure 13:
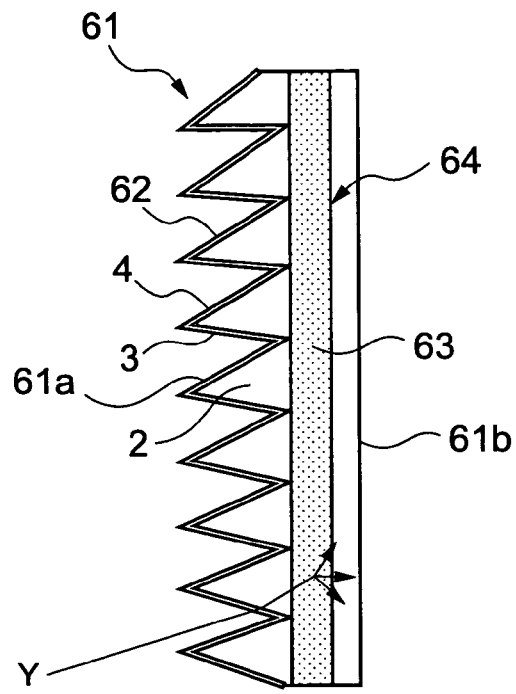
FIG. 13 is a sectional view of a Fresnel lens sheet in a third embodiment according to the present invention.

Referring to FIG. 13, the Fresnel lens sheet 61 has an entrance surface 61a and an exit surface 61b. The entrance surface 61a is coated with a coating layer 62 formed of a substantially transparent material having a refractive index smaller than that of a material forming prisms 2. The coating layer 62 reduces the reflection of image light rays projected thereon by a projector M. The coating layer 62 is formed of, for example, a fluorocarbon resin or a silicone resin.

The Fresnel lens sheet 61 has a diffusing layer 64 containing a diffusing material 63, namely, a light diffusing element, dispersed therein. The diffusing layer 64 prevents the formation of double images due to stray light rays Y refracted on the refraction surfaces 3 and not reached the total-reflection surfaces 4. In the conventional Fresnel lens sheet, for example, stray light rays Y refracted on the refraction surfaces 3 are reflected by the exit surface 61b toward the refraction surfaces 3 and the total-reflection surfaces 4. The stray light rays are refracted again on the refraction surface 3 and are refracted at or reflected by the total-reflection surfaces 4 again, and the stray light rays Y thus refracted and reflected emerge from the exit surface 61b to form a double image. According to the present invention, the diffusing material 63 dispersed in the diffusing layer 64 diffuses the stray light rays Y while the stray light rays Y travel between the refraction surfaces 3 and the total-reflection surfaces 4, and the exit surface 61b to reduce the intensity of the stray light rays Y. As a result, a ghost image formed by the stray light rays Y is reduced and the problem attributable to the double image can be made insignificant. The diffusing material 63 is, for example, an organic material, such as an acrylic resin, styrene resin or a melamine resin, or an inorganic material, such as a vitreous material, titanium oxide, coating mica, calcium carbonate or ZnO. The amount of the diffusing material 63 dispersed in the diffusing layer 64 is adjusted such that the diffusing layer 64 has a diffusion half angle of 10° or below, preferably 5° or below, more preferably, on the order of 2°.

Figure 14:
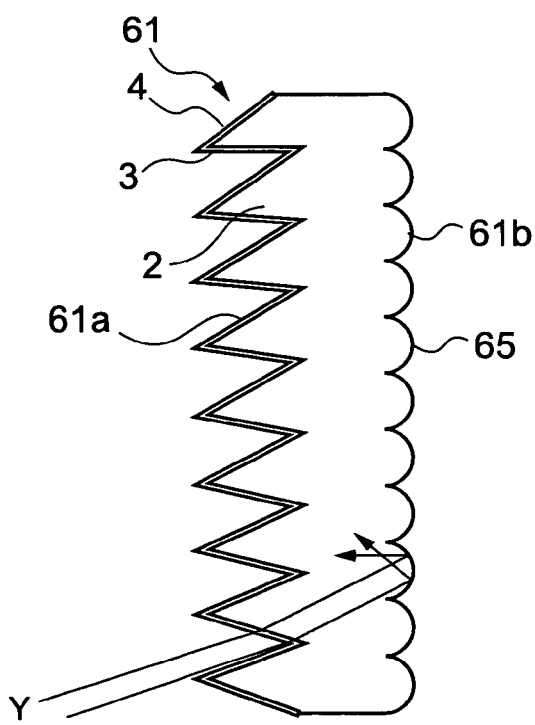
FIG. 14 is a sectional view of another Fresnel lens sheet in the third embodiment-according to the present invention.

The Fresnel lens sheet 61 may include a horizontal lenticular sheet (horizontal lenticular lens sheet) 65 formed on the exit surface 61b, including horizontal semicylindrical lenses as shown in FIG. 14 as the light diffusing element instead of the diffusing layer 64. Stray light rays Y reflected by the exit surface 61b are diffused by the horizontal lenticular sheet 65. As a result, the intensity of the stray light rays Y emerging from the exit surface 61b is reduced and the problem attributable to a double image can be made insignificant.

Figure 15:
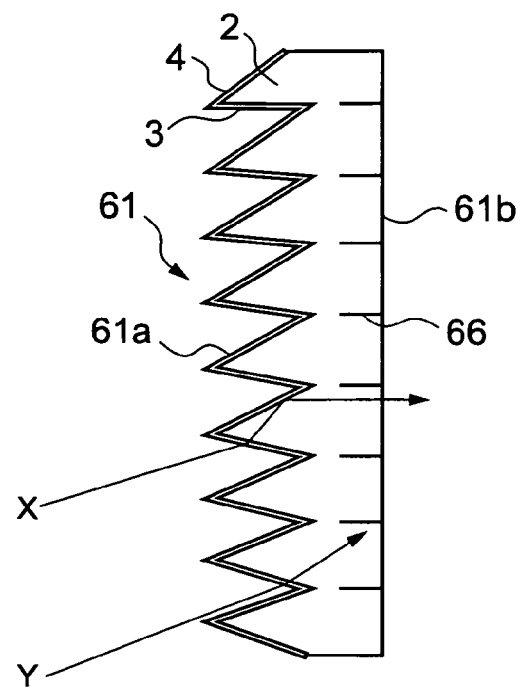
FIG. 15 is a sectional view of a third Fresnel lens sheet in the third embodiment according to the present invention.
Figure 16:
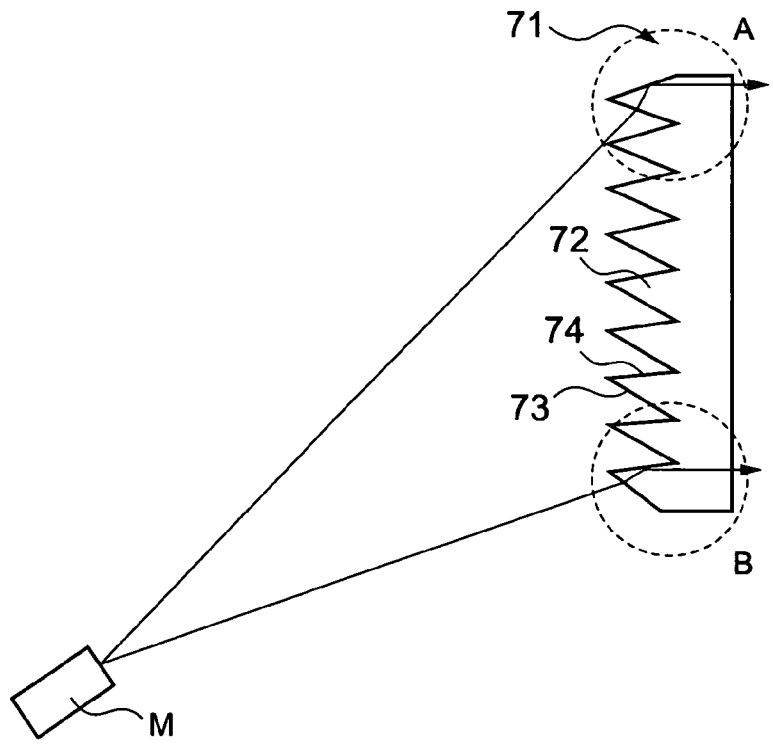
FIG. 16 is a sectional view of a conventional Fresnel lens sheet.
Figure 17A:
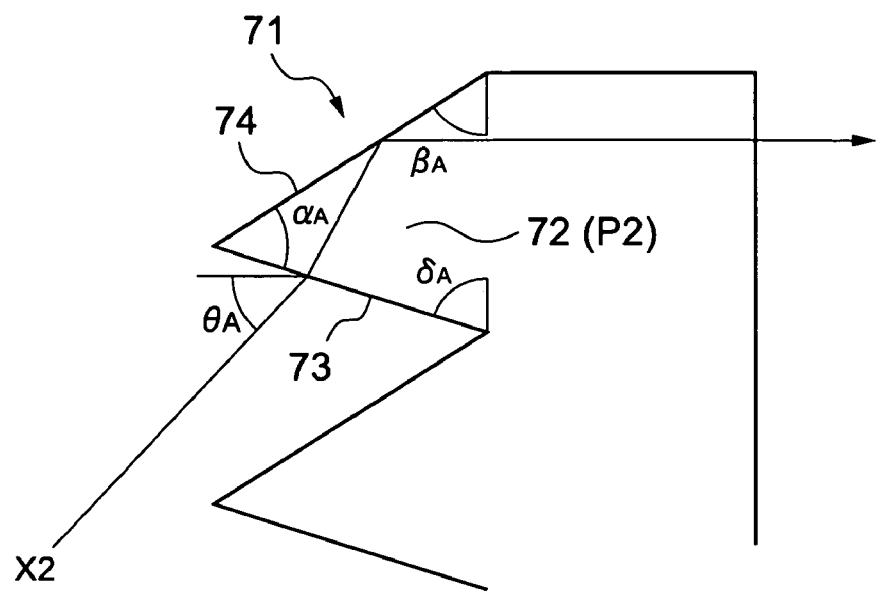
FIG. 17A is a fragmentary enlarged view of the Fresnel lens sheet shown in FIG. 16.
Figure 17B:
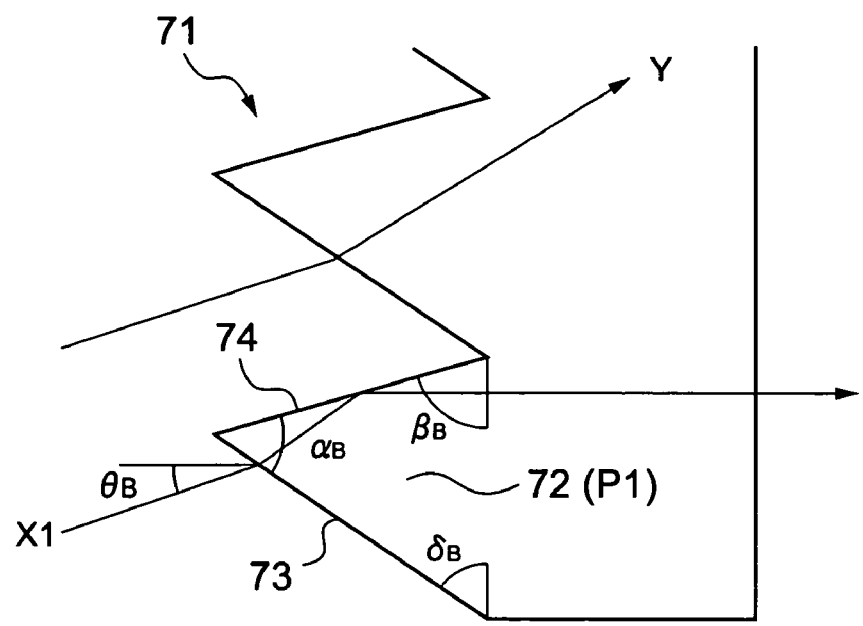
FIG. 17B is a fragmentary enlarged view of the Fresnel lens sheet shown in FIG. 16.
Figure 18:
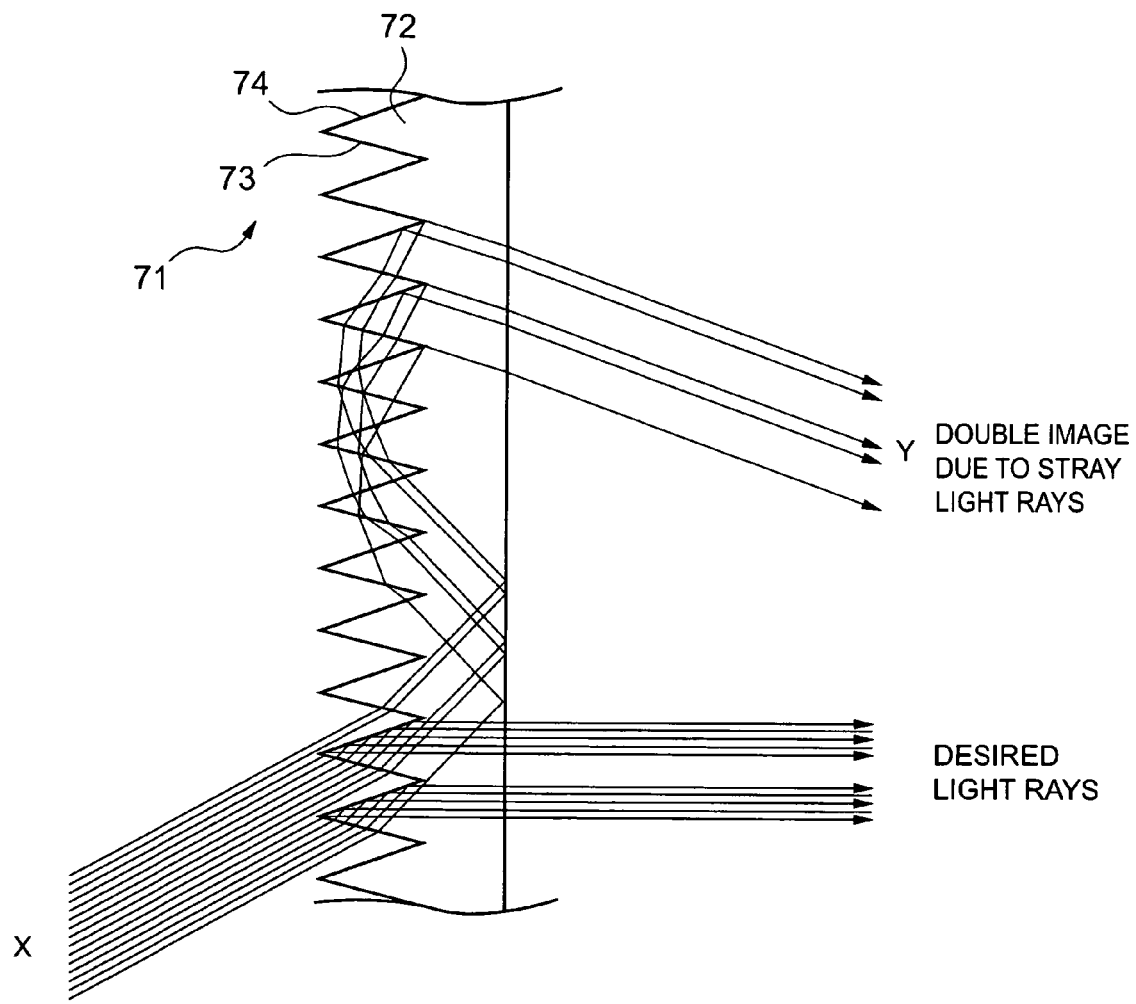
FIG. 18 is a diagrammatic view of assistance in explaining stray light rays in a Fresnel lens sheet.

The Fresnel lens sheet 61 may be provided with light receiving plates (light absorbing layers) 66 perpendicular to the exit surface 61b as the light absorbing element as shown in FIG. 15 instead of the diffusing layer 64. In this case, desired light rays X, namely incident light rays other than stray light rays, travel in a direction perpendicular to the exit surface 61b and do not fall on the light absorbing plates 66. On the other hand, the stray light rays Y traveling obliquely to the exit surface 61b fall on the light absorbing plates 66 and are absorbed by the light absorbing plates 66. Consequently, the amount of stray light rays Y emerging from the exit surface 61b can be reduced and the problem attributable to a double image can be solved. The light absorbing plates 66 may be formed of only a light-absorptive material, such as carbon black or may be plates coated with a light-absorptive material, such as carbon black.

The Fresnel lens sheet 61 may be formed of a material containing a coloring material as the light absorbing element instead of being provided with the diffusing layer 64. Since distances traveled by the stray light rays Y in the Fresnel lens sheet 61 is longer than those traveled by the desired light rays, the amount of the stray light rays Y absorbed by the coloring matter is greater than that of the desired light rays X absorbed by the coloring matter, so that the ghost image of the double image can be obscured. The coloring material may have a black pigment or the like. Since the coloring material absorbs the desired light rays also, it is desirably to adjust the coloring material content of the Fresnel lens sheet 61 so that the normal light absorptance of the Fresnel lens sheet 61 is 50% or below.

EXAMPLES

Examples of the present invention and comparative examples will be comparatively described.

Fresnel lens sheets in Examples 1 and 2 and Fresnel lens sheets in Comparative examples 1 and 2 were fabricated, and the abilities of those Fresnel lens sheets were examined. A Fresnel lens sheet was set in a vertical manner and light was projected by a projector disposed at a position at a vertical distance of 200 mm below the lower end of a Fresnel lens sheet and at a horizontal distance of 285 mm from the entrance surface of the Fresnel lens sheet. The ability of the Fresnel lens sheet was evaluated in terms of the transmission efficiency of a prism the nearest to the projector (hereinafter referred to as "the innermost prism) of the Fresnel lens sheet. Transmission efficiency is the ratio of the quantity of light reflected by the total-reflection surface and emerged from the Fresnel lens sheet to the quantity of incident light upon the Fresnel lens sheet.

Concretely, transmission efficiency was determined by the following procedure.

(1) A laser beam is projected so as to fall on the Fresnel lens sheet at a predetermined incidence angle.

(2) Energy A of the incident laser beam is measured by an actinometer.

(3) Energy B of the outgoing laser beam traveling in a direction at a predetermined angle is measured by the actinometer.

(4) Transmission efficiency B/A is calculated.

Example 1

A Fresnel lens sheet in Example 1 was formed of a resin having a refracting index of 1.55 in a height of 762 mm and a width of 1016 mm (50 in. Fresnel lens sheet of an aspect ratio of 3 to 4). Angles β between the total-reflection surfaces of the prisms and the sheet surface were determined such that total-reflection surfaces reflect light rays in a direction perpendicular to the sheet surface. The prisms were arranged at a pitch (distance between the peaks of the two adjacent prisms) of 0.11 mm. The angle δ between the refraction surface of a prism farthest from the projector (hereinafter referred to as "the outermost prism") and the sheet surface was 90°.

Example 2

A Fresnel lens sheet in Example 2 was formed of a resin having a refracting index of 1.55 in a height of 762 mm and a width of 1016 mm. Angles β between the total-reflection surfaces of the prisms and the sheet surface were determined such that the total-reflection surface of the outermost prism reflected light rays in a direction at an angle of 5° downward from a direction perpendicular to the sheet surface. The angle of a direction in which the total-reflection surface of a prism nearer to the innermost prism reflected light rays, with respect to the direction perpendicular to the sheet surface was smaller. The angle of a direction in which the total-reflection surface of a prism at a distance of 588 mm toward the projector from the outermost prism reflected light rays, with respect to the direction perpendicular to the sheet surface was 0°. The prisms were arranged at a pitch (distance between the peaks of the two adjacent prisms) of 0.11 mm. The angle δ between the refraction surface of the outermost prism and the sheet surface was 90°.

The angle of a direction in which the total-reflection surface of each prism between the prism at the distance of 588 mm and the innermost prism reflected light ray, with respect to the direction perpendicular to the sheet surface is 0°

Comparative Example 1

A Fresnel lens sheet in Comparative example 1 was formed of a resin having a refracting index of 1.55 in a height of 762 mm and a width of 1016 mm (50 in. Fresnel lens sheet of an aspect ratio of 3 to 4). Angles β between the total-reflection surfaces of the prisms and the sheet surface were determined such that total-reflection surfaces reflected light rays in a direction perpendicular to the sheet surface. The prisms were arranged at a pitch (distance between the peaks of the two adjacent prisms) of 0.11 mm. The angle δ between the refraction surface of the outermost prism and the sheet surface was 61.6°

Comparative Example 2

A Fresnel lens sheet in Comparative example 2 was formed of a resin having a refracting index of 1.55 in a height of 762 mm and a width of 1016 mm (50 in. Fresnel lens sheet of an aspect ratio of 3 to 4). Angles β between the total-reflection surfaces of the prisms and the sheet surface were determined such that total-reflection surfaces reflected light rays in a direction perpendicular to the sheet surface. The prisms were arranged at a pitch (distance between the peaks of the two adjacent prisms) of 0.086 mm. The angle δ between the refraction surface of the outermost prism and the sheet surface was 100.3°.

Results of Evaluation

In the Fresnel lens sheet in Example 1, the angles δ between the refraction surfaces of all the prisms and the sheet surface and the angles β between the total-reflection surfaces and the sheet surface were 90° or below. Thus the Fresnel lens sheet in Example 1 could be satisfactorily formed and could easily be removed from the mold. The innermost prism had a transmission efficiency of 64.8%, which was considerably higher than that of, for example, the Fresnel lens sheet, namely, a conventional Fresnel lens sheet which was designed by placing importance on facility in removing the same from the mold.

In the Fresnel lens sheet in Example 2, the angles δ between the refraction surfaces of all the prisms and the sheet surface and the angles β between the total-reflection surfaces and the sheet surface were 90° or below. Thus the Fresnel lens sheet in Example 2 could be satisfactorily formed and could be easily removed from the mold. The innermost prism had a transmission efficiency of 69.2%, which was higher by about 4% than that of the innermost prism of the Fresnel lens sheet in Example 1.

In the Fresnel lens sheet in Comparative example 1, the angles δ between the refraction surfaces of all the prisms and the sheet surface and the angles β between the total-refraction surfaces of all the prisms and the sheet surface were 90° or below. Thus the Fresnel lens sheet could be satisfactorily formed and could be easily removed from the mold. The innermost prism had a transmission efficiency of 44.9%, which was far less than 50% and Fresnel lens sheet in Comparative example 2 was unacceptable.

In the Fresnel lens sheet in Comparative example 2, the angle δ between the refraction surface of the outermost prism and the sheet surface was 100.3°. Consequently, the Fresnel lens sheet was very difficult to be removed from the mold, and the removal of the Fresnel lens sheet from the mold caused damage to the Fresnel lens sheet. The innermost prism had a high transmission efficiency of 71.3%.

As obvious from the results of evaluation, the Fresnel lens sheets in Examples 1 and 2 were satisfactory in both molding facility and transmission efficiency.

As apparent from the foregoing description, the Fresnel lens sheet according to the present invention can be easily formed, can reduce the ratio of stray light rays to the desired light rays and transmits light rays at a high transmission efficiency. The transmission screen of the present invention employing the Fresnel lens sheet of the present invention and the rear projection display employing the transmission screen of the present invention can be easily fabricated, the transmission screen transmits light rays at a high transmission efficiency, and the rear projection display can be formed in a small thickness and is capable of displaying images having high contrast.

The invention claimed is:

1. A total-reflection Fresnel lens sheet having an entrance surface and an exit surface and capable of sending out light through the exit surface, that is emitted by a light source and fallen on the entrance surface,
   said Fresnel lens sheet comprising a plurality of prisms formed on the entrance surface and each having a refraction surface where light emitted by the light source is refracted and a total-reflection surface that totally reflects the light refracted on the refraction surface;
   wherein angles between the refraction surfaces and the total-reflection surfaces corresponding to the refraction surfaces of all the prisms are substantially equal to each other, and
   the refraction surface of the prism farthest from the light source is substantially at right angles to a sheet surface of the Fresnel lens sheet.

2. The Fresnel lens sheet according to claim 1, wherein the angle between the total-reflection surface of at least the prism farthest from the light source and the sheet surface is determined such that the total-reflection surface reflects light rays in a direction tilted at an angle toward the side of the light source with respect to a perpendicular direction perpendicular to the sheet surface.

3. The Fresnel lens sheet according to claim 1, wherein a low-refraction index layer of a material having a low refractive index is formed on the entrance surface.

4. The Fresnel lens sheet according to claim 1 further comprising; at least one of a light diffusing element that diffuses light and a light absorbing element that absorbs light.

5. The Fresnel lens sheet according to claim 4, wherein the light diffusing element is formed by dispersing a diffusing material so that diffusion half angle is 10° or below.

6. The Fresnel lens sheet according to claim 4, wherein the light diffusing element is a horizontal lenticular lens sheet formed on the exit surface so that diffusion half angle is 10° or below.

7. The Fresnel lens sheet according to claim 4, wherein the light absorbing element contains a coloring material so that the light absorbing element has a light absorptance of 50% or below.

8. The Fresnel lens sheet according to claim 4, wherein the light absorbing element includes a light absorbing layer perpendicular to the sheet surface.

9. A transmission screen comprising:
   a total-reflection Fresnel lens sheet having an entrance surface and an exit surface, capable of sending out light through the exit surface, that is emitted by a light source and fallen on the entrance surface and including a plurality of prisms formed on the entrance surface and each having a refraction surface where light emitted by the light source is refracted and a total-reflection surface that totally reflects the light refracted on the refraction surface, wherein angles between the refraction surfaces and the total-reflection surfaces corresponding to the refraction surfaces of all the prisms are substantially equal to each other, and the refraction surface of the prism farthest from the light source is substantially at right angles to a sheet surface of the Fresnel lens sheet; and
   a light diffusing element for diffusing light rays formed integrally with the Fresnel lens sheet.

10. A transmission screen comprising:
    a total-reflection Fresnel lens sheet having an entrance surface and an exit surface, capable of sending out light through the exit surface, that is emitted by a light source and fallen on the entrance surface including a plurality of prisms formed on the entrance surface and each having a refraction surface where light emitted by the light source is refracted and a total-reflection surface that totally reflects the light refracted on the refraction surface, wherein angles between the refraction surfaces and the total-reflection surfaces corresponding to the refraction surfaces of all the prisms are substantially equal to each other, and the refraction surface of the prism farthest from the light source is substantially at right angles to a sheet surface of the Fresnel lens sheet; and
    a light diffusing element for diffusing light rays positioned on the exit surface of the Fresnel lens sheet.

11. A rear projection display comprising:
    a box serving as a housing and having a front wall provided with a window;
    a transmission screen including a total-reflection Fresnel lens sheet placed in the window formed in the front wall of the box, having an entrance surface and an exit surface, capable of sending out light through the exit surface, that is emitted by a light source and fallen on the entrance surface and including a plurality of prisms formed on the entrance surface and each having a refraction surface where light emitted by the light source is refracted and a total-reflection surface that totally reflects the light refracted at the refraction surface, wherein angles between the refraction surfaces and the total-reflection surfaces corresponding to the refraction surfaces of all the prisms are substantially equal to each other, and the refraction surface of the prism farthest from the light source is substantially at right angles to a sheet surface of the Fresnel lens sheet, and a light diffusing element for diffusing light rays formed integrally with the Fresnel lens sheet in the Fresnel lens sheet; and a projector disposed in the box and capable of projecting image light rays from behind the transmission screen at acute incidence angles on the entrance surface of the transmission screen.

12. A rear projection display comprising:

a box serving as a housing and having a front wall provided with a window;

a transmission screen including a total-reflection Fresnel lens sheet placed in the window formed in the front wall of the box, having an entrance surface and an exit surface, capable of sending out light through the exit surface, that is emitted by a light source and fallen on the entrance surface, and including a plurality of prisms formed on the entrance surface and each having a refraction surface where light emitted by the light source is refracted and a total-reflection surface that totally reflects the light refracted at the refraction surface, wherein angles between the refraction surfaces and the total-reflection surfaces corresponding to the refraction surfaces of all the prisms are substantially equal to each other, and the refraction surface of the prism farthest from the light source is substantially at right angles to a sheet surface, and a light diffusing element for diffusing light rays positioned on the exit surface of the Fresnel lens sheet; and a projector disposed in the box and capable of projecting image light rays from behind the transmission screen at acute incidence angles on the entrance surface of the transmission screen.

* * * * *